(12) United States Patent
Muromura

(10) Patent No.: US 8,884,528 B2
(45) Date of Patent: Nov. 11, 2014

(54) VASE-SHAPED DEVICE, LIGHT WALL DEVICE, AND SYSTEM

(71) Applicant: Sachiko Muromura, Tokyo (JP)

(72) Inventor: Sachiko Muromura, Tokyo (JP)

( * ) Notice: Subject to any disclaimer, the term of this patent is extended or adjusted under 35 U.S.C. 154(b) by 0 days.

(21) Appl. No.: 13/712,813

(22) Filed: Dec. 12, 2012

(65) Prior Publication Data

US 2013/0320860 A1 Dec. 5, 2013

(30) Foreign Application Priority Data

May 31, 2012 (JP) ................................ 2012-125542

(51) Int. Cl.
| | |
|---|---|
| *H05B 37/02* | (2006.01) |
| *H05B 39/04* | (2006.01) |
| *H05B 41/36* | (2006.01) |
| *G01J 1/32* | (2006.01) |
| *F21V 21/00* | (2006.01) |

(52) U.S. Cl.
CPC ................ *H05B 37/02* (2013.01); *F21V 21/00* (2013.01)
USPC .......................................... 315/151; 250/205

(58) Field of Classification Search
CPC ...... H05B 37/02; H05B 41/32; H05B 41/325; H05B 41/3922; H05B 39/042; F21V 21/00; G03B 15/05
USPC ...................... 315/151; 362/249.01, 382–456
See application file for complete search history.

(56) References Cited

U.S. PATENT DOCUMENTS

| | | | | |
|---|---|---|---|---|
| 7,358,929 | B2 * | 4/2008 | Mueller et al. ................. | 345/1.3 |
| 2005/0116667 | A1 * | 6/2005 | Mueller et al. ................. | 315/312 |
| 2008/0174515 | A1 * | 7/2008 | Matthies et al. ................ | 345/1.3 |
| 2009/0034241 | A1 * | 2/2009 | Coushaine et al. ............ | 362/145 |
| 2009/0128044 | A1 * | 5/2009 | Nevins ........................... | 315/182 |
| 2010/0109567 | A1 * | 5/2010 | Deurenberg et al. .......... | 315/294 |
| 2011/0286213 | A1 * | 11/2011 | Van Herpen et al. .......... | 362/234 |
| 2012/0106194 | A1 * | 5/2012 | Ashoff et al. .................. | 362/602 |
| 2012/0224373 | A1 * | 9/2012 | Snijder et al. ............. | 362/249.01 |
| 2013/0304019 | A1 * | 11/2013 | Cooper et al. ................. | 604/501 |

FOREIGN PATENT DOCUMENTS

| | | |
|---|---|---|
| JP | 03-252091 A | 11/1991 |
| JP | 04-190593 A | 7/1992 |
| JP | 11-066915 A | 3/1999 |
| JP | 2003-039898 A | 2/2003 |
| JP | 2003-290009 A | 10/2003 |

OTHER PUBLICATIONS

S.Kodama et al.; "Blooming Space: Color-Changing Sculpture that Reflects Real Flower's Color Sensed by Vase-Shaped Device Having Embedded Full-Color Sensors and LEDs"; SIGGRAPH Asia 2011; Hong Kong, China; Dec. 12-15, 2011.

S.Kodama et al.; "Blooming Space: Color-Changing Sculpture that Reflects Real Flower's Color Sensed by Vase-Shaped Device Having Embedded Full-Color Sensors and LEDs"; The University of ElectroCommunications.

\* cited by examiner

*Primary Examiner* — Dylan White

(74) *Attorney, Agent, or Firm* — Studebaker & Brackett PC

(57) ABSTRACT

An objective is to provide a vase-shaped device, a light wall device, and a system which accentuate the beauty of flowers by implementing "interactive flower arrangement" in which the color of the vase-shaped device and that of a space around the vase-shaped device change according to the color of the arranged flowers so as to entertain users. To achieve the above objective, provided is a vase-shaped device including light-emitting devices as an output unit configured to output a signal as controlled.

14 Claims, 8 Drawing Sheets

VASE-SHAPED DEVICE, LIGHT WALL DEVICE, AND SYSTEM

CROSS-REFERENCE TO RELATED APPLICATIONS

This application claims the benefit of Japanese Patent Application No. 2012-125542, filed May 31, 2012, which is hereby incorporated by reference herein in its entirety.

BACKGROUND OF THE INVENTION

1. Field of the Invention

The present invention relates to a vase-shaped device configured to output signals according to the color of arranged flowers to provide beautiful presentation of the flowers, a light wall sculpture configured to operate in conjunction with this vase-shaped device, and a blooming space including the vase-shaped device and the light wall sculpture.

Herein, the light wall sculpture indicates a device which includes a light wall (a decorative body placed on a wall surface) provided with tiles and light-emitting devices and which is configured to operate in conjunction with the vase-shaped device to provide spatial decoration.

Further, herein, the blooming space indicates a system in which techniques such as an electrical technique, an electronic technique, an information technique, and a communication technique are incorporated in an object formed for the purpose of decoration so as to move the object itself, to change the appearance of the object, or to have interaction with another object or with a change in another object. Thus, the system has a function of enhancing an aesthetic effect of a decorated item and the decorative object.

A conventional object configured to decorate a building or a piece of furniture usually does not move or change. In contrast, in the blooming space, techniques such as an electrical technique, an electronic technique, an information technique, and a communication technique are incorporated in an object formed for the purpose of decorating something, so as to move the object, to change the appearance of the object, such as its color, texture, lighting, or shading, or to have interaction with a change in another object. Thus, the blooming space makes it possible to change the external aesthetic properties of the decorated item and the decorative object dynamically with time.

2. Description of the Related Art

A vase is a familiar decorative object used to enjoy flower arrangement at home or in commercial facilities. In recent years, vases incorporated with lights have been developed. The incorporated lights allow illumination of the vase, and further, illumination of an object around the vase.

As such a technique, there is a decorative body for providing spatial presentation by causing light to be emitted by LEDs incorporated in the decorative body and then to be reflected from a reflector incorporated in the decorative body (see, for example, Japanese Patent Application Laid-Open No. 2003-39898).

Further, there is a flower stand configured to illuminate artificial flowers or real flowers from an electric stand to provide harmony of light and the flowers in an integrated manner (see, for example, Japanese Patent Application Laid-Open No. H11-66915). Furthermore, there is a flower light arrangement in which arranged flowers and a stand are united with a heat insulator interposed in between to illuminate the flowers (see, for example, Japanese Patent Application Laid-Open No. 2003-290009).

Moreover, there is a lighting device configured to measure the state of a person's living space and to control how a lamp is driven according to a result of the measurement (see, for example, Japanese Patent Application Laid-Open No. H04-190593). In addition, there is a lighting device configured to measure the amount of ambient light or sound using a detection sensor, convert this measured value into a voltage value or a current value, supply the converted value to light emitters, and thus changes the amount of light emitted by the light emitters. Thereby, the amount and color of light emitted by the lighting device are changed according to the ambient environment (see, for example, Japanese Patent Application Laid-Open No. H03-252091).

SUMMARY OF THE INVENTION

The decorative body described in Japanese Patent Application Laid-Open No. 2003-39898 uses light inside the decorative body but cannot detect the color of the flowers to change the surface color of the decorative body. The flower stand described in Japanese Patent Application Laid-Open No. H11-66915 and the flower light arrangement described in Japanese Patent Application Laid-Open No. 2003-290009 only illuminate the flowers, and cannot detect the color of the flowers to change the surface color of the stand. Accordingly, in the techniques disclosed in these publications, even when timely seasonal flowers are put in a vase, the vase does not change according to the color of the flowers. Consequently, the above techniques fail to provide an effect of spatial decoration around the arranged flowers through accentuation of the beauty unique to the flowers by emphasizing the color of the flowers.

Moreover, the lighting device described in Japanese Patent Application Laid-Open No. H04-190593 changes the hue of room lighting by measuring the ambient situation, but is not provided with a function of reliably detecting the color of flowers put in a vase. Accordingly, this lighting device is not for decorating the space around arranged flowers by allowing interaction between the color of the flowers put in the vase and the color of the vase through computations for accentuating the color of the flowers.

Furthermore, the lighting device described in Japanese Patent Application Laid-Open No. H03-252091 changes the amount and color of light emitted by the lighting device according to the ambient environment, but has a shape of a lamp as a lighting device. For this reason, this lighting device does not have a shape of a vase in which flower illuminators and a sensor are incorporated at appropriate positions and angles so that when flowers are put in a container of water, light can be applied to the flowers to detect the color of the flowers. Moreover, this lighting device is not configured such that the vase, in which the color of flowers is detected when the flowers are put in the vase, and tiles, which are configured to decorate the ambient space of the flowers, change in color according to the color of the flowers put in the vase. Accordingly, this lighting device is not for decorating the space around arranged flowers by allowing interaction between the color of the flowers put in the vase and the color of the vase through computations for accentuating the color of the flowers.

An objective of the present invention is to implement novel "interactive flower arrangement" which also includes creation of spatial decoration, and to provide a vase-shaped device, a light wall sculpture, and a blooming space which can provide an effect of spatial decoration around the flowers, the spatial decoration reflecting the flexible flower-arrangement performance of the artist.

Means for solving the problem is a vase-shaped device comprising: an output unit configured to output a signal as controlled; a first light-emitting device configured to illuminate a flower put in the vase-shaped device; a color sensor configured to obtain data on a color of the flower by using light emitted by the first light-emitting device and reflected from the flower; a determination unit configured to determine the color of the flower based on the data obtained by the color sensor; and a control processing unit configured to generate the signal to be outputted from the output unit, according to a result of the determination by the determination unit.

Another means for solving the problem is a light wall sculpture comprising: a control processing unit configured to generate a tile light-emitting signal according to a signal received through a first communication unit; and a tile including a third light-emitting device configured to emit light according to the tile light-emitting signal.

Yet another means for solving the problem is a blooming space comprising a vase-shaped device, a light wall sculpture, and a first communication unit. In this blooming space, the vase-shaped device includes: an output unit configured to output a first signal as controlled; a first light-emitting device configured to illuminate a flower put in the vase-shaped device; a color sensor configured to obtain data on a color of the flower by using light emitted by the first light-emitting device and reflected from the flower; a determination unit configured to determine the color of the flower based on the data obtained by the color sensor; and a control processing unit configured to generate the first signal to be outputted from the output unit, according to a result of the determination by the determination unit, and for controlling output of the first signal. The first communication unit is a communication unit configured to send a signal indicating the color obtained by the color sensor to the light wall sculpture. The light wall sculpture includes: a control processing unit configured to generate a tile light-emitting signal according to the color-indicating signal received through the first communication unit; and a tile including a third light-emitting device configured to emit light according to the tile light emitting signal.

DESCRIPTION OF THE EMBODIMENTS

Embodiments of the present invention are described below in detail with reference to the drawings.

Figure 1:
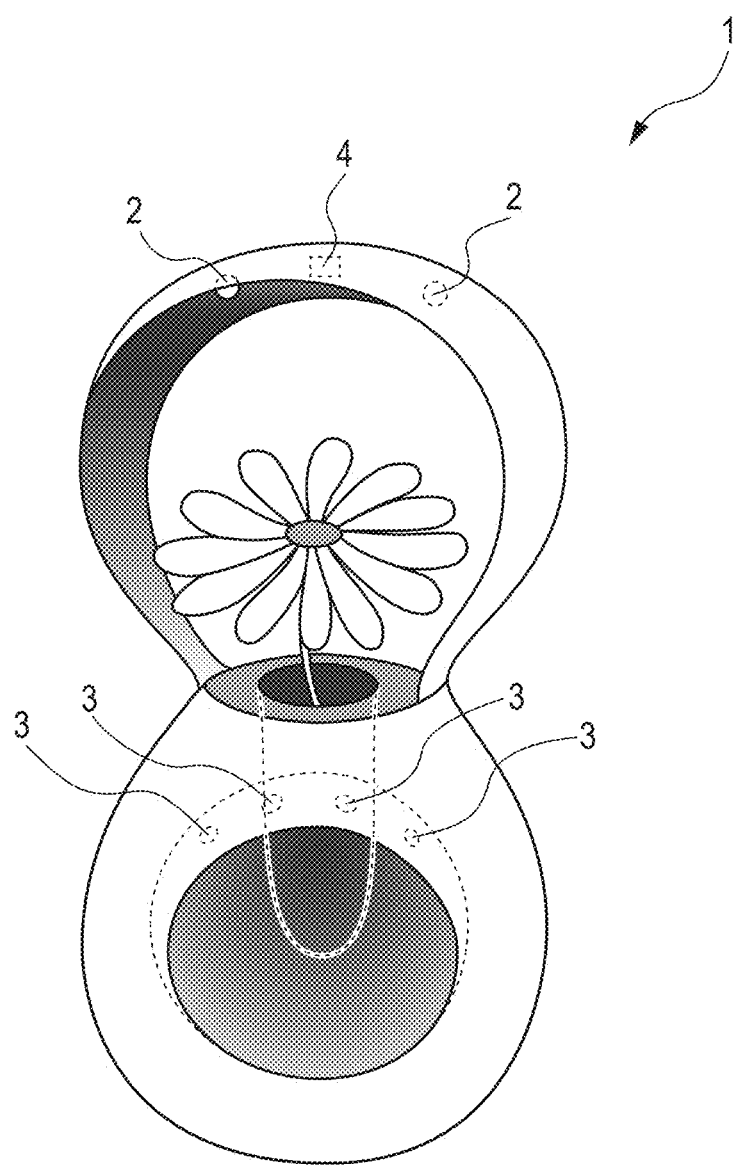
FIG. 1 is a schematic view of a vase-shaped device according to first, second, sixth to seventeenth embodiments of the present invention.

As shown in FIG. 1, a vase-shaped device 1 according to a first embodiment of the present invention includes white LEDs 2 which are light-emitting devices attached to an upper portion of the vase-shaped device 1, full-color LEDs 3 which are output devices attached to a lower portion of the vase-shaped device 1, a color sensor 4 installed at the upper portion of the vase-shaped device 1 and configured to obtain data on the color of a flower put in the vase-shaped device 1, and a control device configured to determine the color of the flower based on the data obtained, to generate an output signal according to the color determined, and to control, based on this output signal, signal output of the output devices incorporated in the vase-shaped device 1. The control device may be, for example, a controller 5 shown in FIG. 2. The flower may be, for example, a natural flower, an artificial flower, a leaf and so on.

The vase-shaped device 1 has, at its upper portion, a cover which covers a flower put in the vase-shaped device 1 from above. The white LEDs 2 and the color sensor 4 are attached to a lower portion of this cover to be located immediately above the flower put in the vase-shaped device 1, so that they cannot be seen by the user or audience. Further, the lower portion of the vase-shaped device 1 has a dimple at the center, and the full-color LEDs 3 are attached inside this dimple at the center. Accordingly, the full-color LEDs 3 cannot be seen by the user or audience, either.

Figure 3:
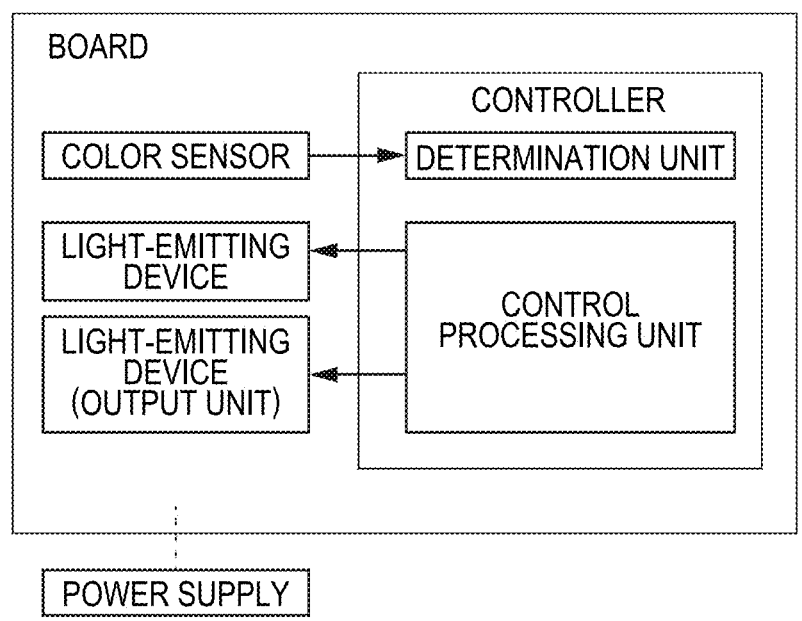
FIG. 3 is a view illustrating a board of the vase-shaped device shown in FIG. 1.

A control board as shown in FIG. 3 is provided for the vase-shaped device 1.

As shown in FIG. 3, the vase-shaped device 1 according to the first embodiment of the present invention operates as follows. First, the white LEDs 2 are driven to illuminate a flower put in the vase-shaped device 1. Then, the color sensor 4 receives light emitted by the white LEDs 2 and reflected from the flower, and thereby obtains data on the color of the flower put in the vase-shaped device 1. Then, the control device determines the color of the flower based on the data obtained, generates an output signal according to the color determined, and controls, based on this output signal, signal output of the output devices (the light-emitting devices in FIG. 3 are just an example) incorporated in the vase-shaped device 1.

In this way, the output devices incorporated in the vase-shaped device 1 perform output according to the color of the arranged flower to provide beautiful presentation of the flower arrangement and to provide a decoration effect for the surrounding space of the arranged flower by representing the flexible flower-arrangement performance of the artist.

A vase-shaped device 1 according to a second embodiment of the present invention is the same as that of the first embodiment.

As shown in FIG. 3, the vase-shaped device 1 according to the second embodiment of the present invention operates as follows. First, the white LEDs 2 are lighted to illuminate a flower put in the vase-shaped device 1. Then, the color sensor 4 receives light emitted by the white LEDs 2 and reflected from the flower, and thereby obtains data on the color of the flower put in the vase-shaped device 1. Then, the control device determines the color of the flower based on the data obtained and generates, according to the color determined, a signal for changing at least one of the color, luminous intensity, and blinking speed of light emitted by the full-color LEDs 3. The control device then causes the full-color LEDs 3 incorporated in the vase-shaped device 1 to emit light according to the generated signal.

Figure 5:
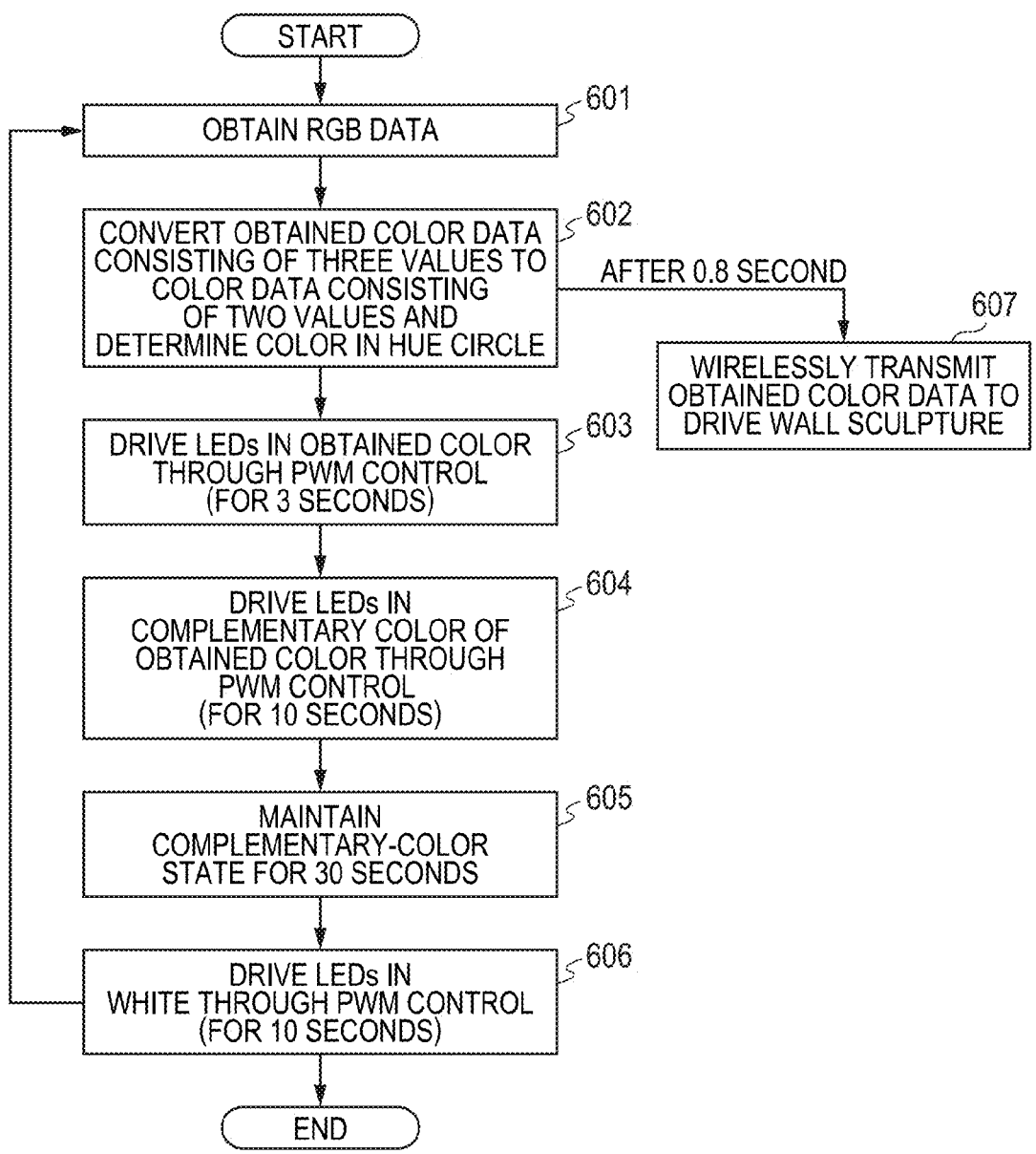
FIG. 5 is a flowchart of processing performed by the vase-shaped device shown in FIG. 1 and processing performed by the vase-shaped device shown in FIG. 2 among the vase-shaped device, the light wall sculpture, and the blooming space in FIG. 2.

Color control of the vase-shaped device 1 according to the second embodiment of the present invention is performed as shown in FIG. 5. Specifically, the color sensor 4 obtains RGB (red, green, and blue) data (601). Then, focusing on the hue space, the data obtained is converted from data consisting of three values (X, Y, Z) into data consisting of two values (x, y) corresponding to one point on a hue circle, to determine a color to be outputted from the full-color LEDs 3 (602). Specifically, the conversion of the obtained value is performed by: obtaining an intersection between a vector and a unit plane formed by connecting reference points of the X axis, the Y axis, and the Z axis; and projecting this intersection onto the XY plane. Then, ON/OFF drive of each full-color LED 3 is controlled at high speed through pulse-width modulation (PWM) control, such that the full-color LEDs 3 are driven to emit the obtained color for three seconds (603), and then is lighted in the complementary color of the obtained color for ten seconds (604). For example, when the flower color is orange, the full-color LEDs 3 are driven to emit blue or a color with a similar hue to blue.

The full-color LEDs 3 are maintained at the complementary-color state for 30 seconds through static control (605), and are thereafter driven to emit white for ten seconds through PWM control (606). Subsequently, the color sensor 4 again obtains RGB data (601), and the operations from 601 to 606 are repeated.

When the color sensor 4 obtains (detects) the color with high frequency, the color of the vase-shaped device 1 can be changed in real time while the flowers are being arranged in the vase-shaped device 1.

Further, instead of being driven to emit the complementary color of the color of the flower, the full-color LEDs 3 may be driven to emit a color with the same hue as but a different saturation level from the color of the flower, or a color with a similar hue to the color of the flower. For example, when the color of the flower is blue, the full-color LEDs 3 may be lighted in a color with the same hue as but a different saturation level from blue or a color with a similar hue to blue.

Furthermore, instead of being driven to emit the complementary color of the color of the flower, the multiple full-color LEDs 3 attached to the vase-shaped device 1 may be lighted with a pattern suitable for a ceremonial occasion such as a wedding or a funeral. For example, when the color of the flower is red, the full-color LEDs 3 may be lighted with a pattern of red-and-white stripes or a checker.

In this way, the full-color LEDs 3 incorporated in the vase-shaped device 1 perform output according to the color of the arranged flower to provide beautiful presentation of the flower arrangement and to provide a decoration effect for the surrounding space of the arranged flower by representing the flexible flower-arrangement performance of the artist.

Figure 2:
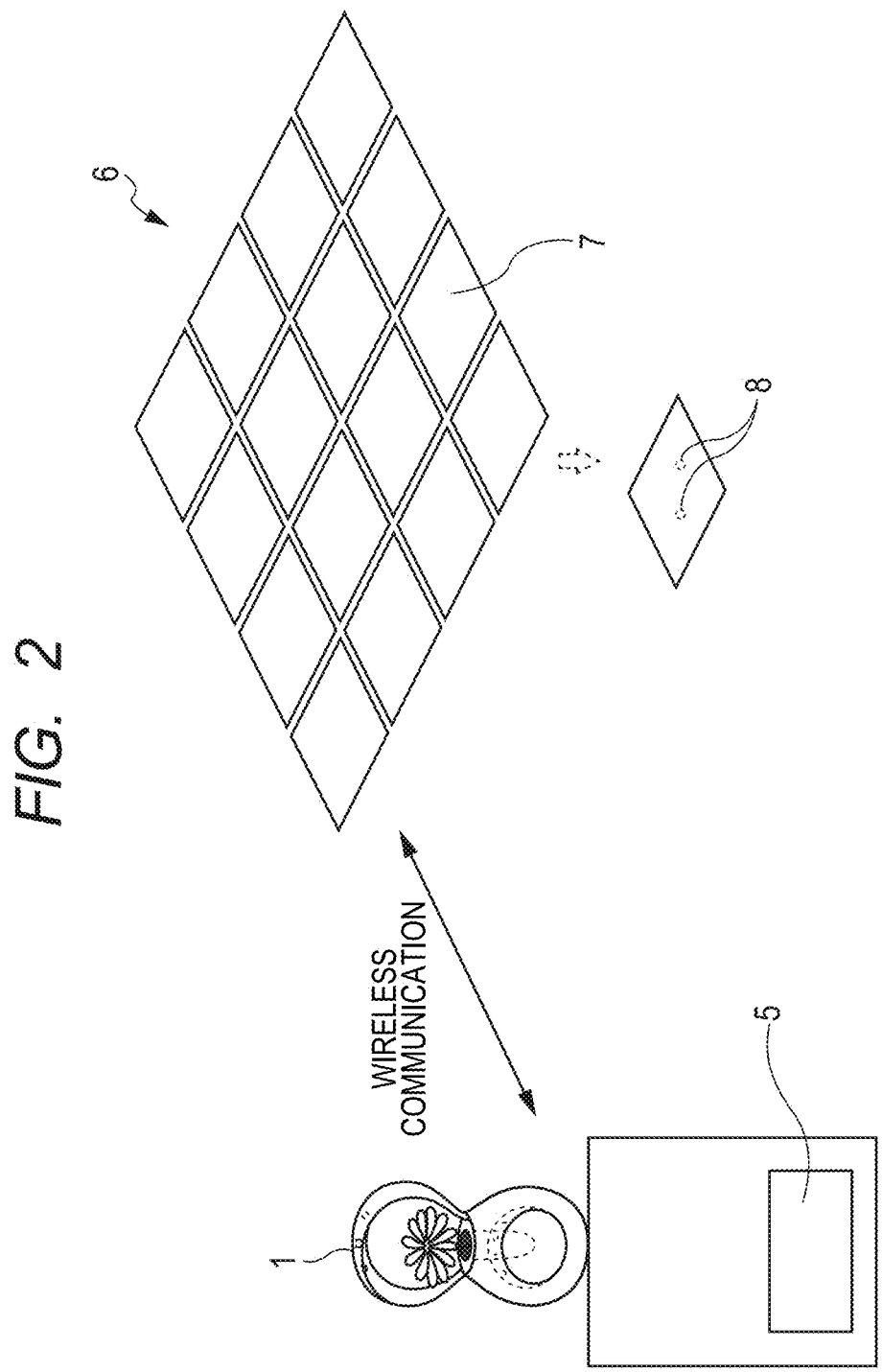
FIG. 2 is a schematic view of the vase-shaped device, a light sculpture, and a blooming space according to the first to seventeenth embodiment of the present invention.

As shown in FIG. 2, a light wall sculpture according to a third embodiment of the present invention includes: a controller 5 which is a control device configured to generate a tile light-emitting signal according to the obtained signal indicating the color of the flower and to thus control output of light-emitting devices in the tiles; and a light wall 6. The light wall 6 includes tiles 7 in each of which full-color LEDs 8 are incorporated.

Figure 4:
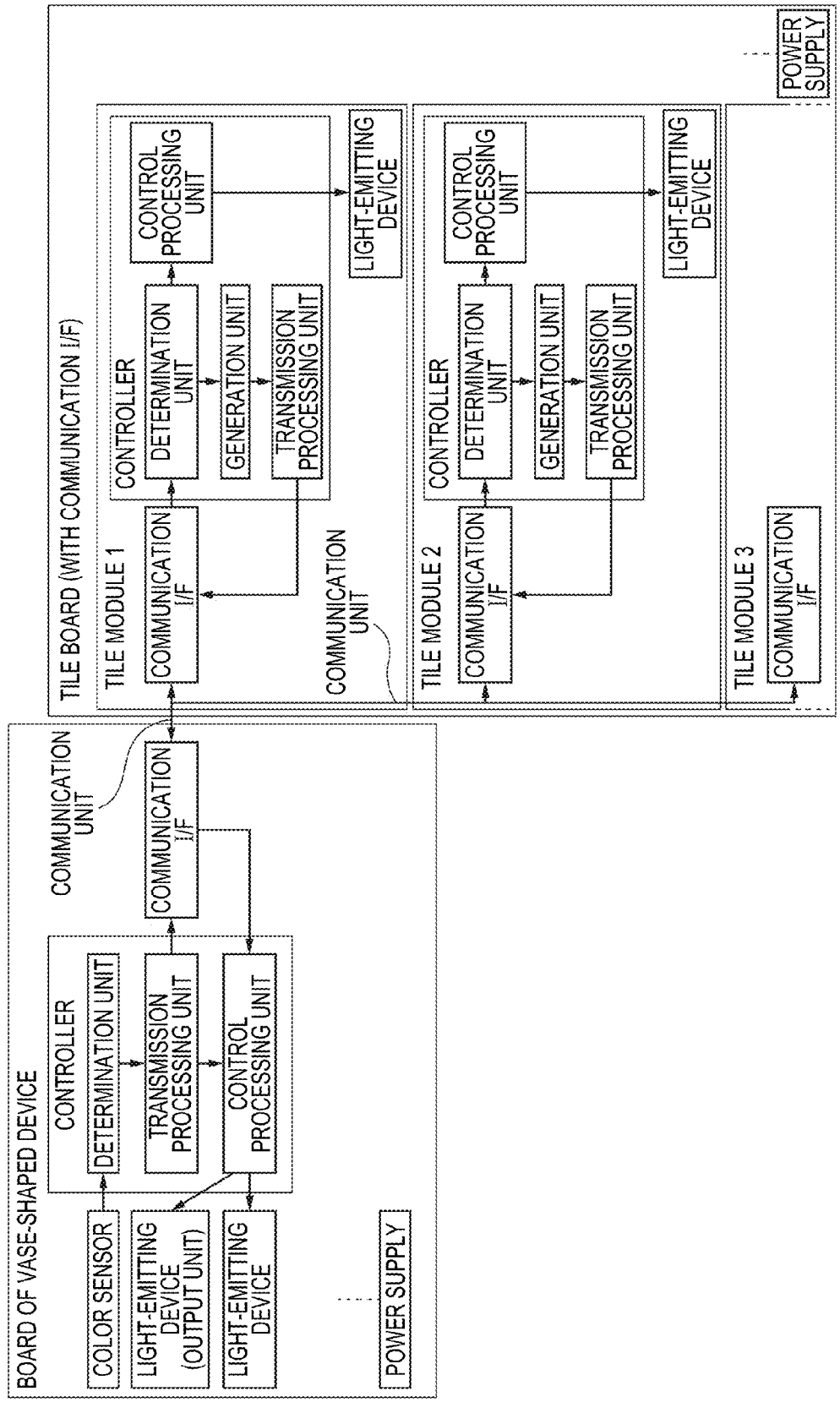
FIG. 4 is a view illustrating boards of the vase-shaped device, the light wall sculpture, and the blooming space shown in FIG. 2.

Control boards as shown in FIG. 4 are provided for the light wall sculpture.

As shown in the tile boards in FIG. 4, the light wall sculpture according to the third embodiment of the present invention operates as follows. Specifically, the light wall sculpture receives a signal indicating the color of the arranged flower, and the controller generates tile light-emitting signals according to the received flower-color signal and thereby causes the multiple full-color LEDs 8 incorporated in the tiles 7 to emit light.

In this way, the light wall sculpture operates according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

A light wall sculpture according to a fourth embodiment of the present invention includes multiple tile modules and a communication unit configured to send a tile light emitting signal generated by one of tile modules to and received by another one of the tile modules. As shown in FIG. 2, each tile module includes: a controller 5 which is a control device configured to generate a tile light-emitting signal of its own tile module according to the acquired signal indicating the color of the flower or according to a tile light-emitting signal from another one of the tile modules, and to control output of the light-emitting devices of its own tile module; and a light wall 6.

A control boards as shown in FIG. 4 are provided for the light wall sculpture.

As shown in the tile boards in FIG. 4, the light wall sculpture according to the fourth embodiment of the present invention operates as follows. First, the light wall sculpture receives a signal indicating the color of the arranged flower. Then, the controller generates a tile light emitting signal according to the received flower-color-indicating signal and causes the multiple full-color LEDs 8 incorporated in its tile 7 to emit light. Further, a tile light-emitting signal generated by one of the tile modules is sent to at least one of the another tile modules through wireless communication. Then, the controller of the another tile module generates a tile light-emitting signal of its own tile module according to the received tile light-emitting signal, and thereby causes the multiple full-color LEDs 8 incorporated in its tile 7 to emit light.

In this way, the light wall sculpture operates according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

A light wall sculpture according to a fifth embodiment of the present invention is the same as that of the fourth embodiment.

As shown in the tile modules in FIG. 4, the light wall sculpture according to the fifth embodiment of the present invention operates as follows. First, the light wall sculpture receives a signal indicating the color of an arranged flower. Then, the controller generates a tile light-emitting signal according to the received flower-color-indicating signal to change at least one of the color, luminous intensity, and blinking speed of light emitted by the multiple full-color LEDs 8 incorporated in the tile 7 of at least one of the tile modules constituting the light wall sculpture. Then, adjacent tile modules exchange signals through wireless communication. The controller generates a tile light-emitting signal of its own tile module according to the signal acquired from its adjacent tile module, and changes at least one of the color, luminous intensity, and blinking speed of light emitted by the full-color LEDs 8 incorporated in the tile 7 of that tile module.

Figure 6:
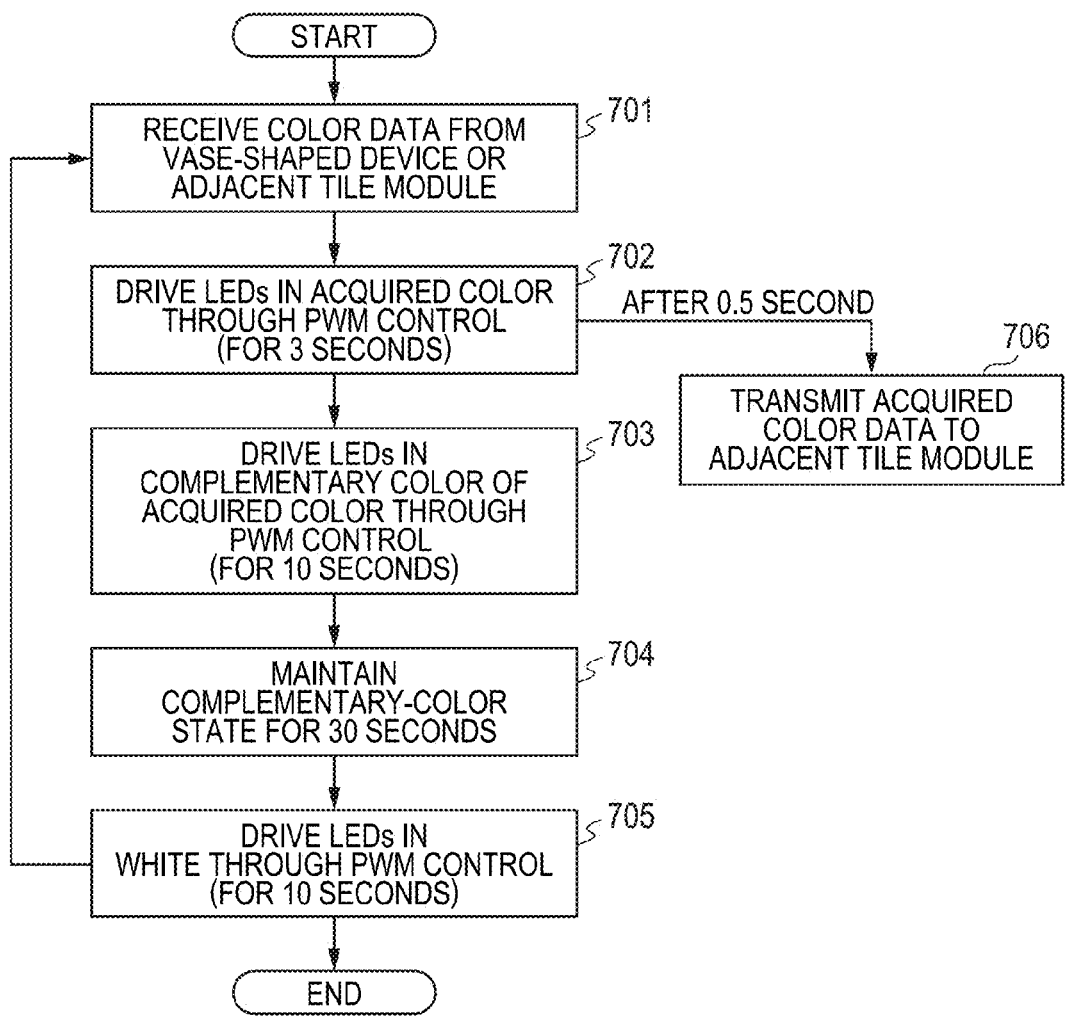
FIG. 6 is a flowchart of processing performed by the light wall sculpture shown in FIG. 2 among the vase-shaped device, the light wall sculpture, and the blooming space in FIG. 2.

As shown in FIGS. 5 and 6, the light wall sculpture according to the fifth embodiment of the present invention is controlled as follows. Specifically, the color sensor 4 of the vase-shaped device 1 obtains RGB data (601), and the RGB data is sent wirelessly to the light wall sculpture 0.8 seconds after the RGB data is obtained (607).

Each tile module receives the color data from the vase-shaped device 1 or forms its adjacent tile module (701). Then, through PWM control, the tile module drives the full-color LEDs 8 in a color indicated by the acquired data for three seconds (702), and then in the complementary color of the acquired color for ten seconds (703). For example, when the color of the flower is orange, the tile module drives the full-color LEDs 8 in the tile 7 in blue or a color with a similar but to blue.

Further, the tile module maintains the complementary-color state of the full-color LEDs 8 for about 30 seconds through static control (704), and thereafter drives the full-color LEDs 8 in white for ten seconds (705). After that, the tile module acquires color data from the vase-shaped device 1 or the adjacent tile module again (701), and the operations from 701 to 705 are repeated.

Also, the tile module sends the color data to its adjacent tile module (706) 0.5 second after receiving the color data from the vase-shaped device 1 or the adjacent tile module (701) and driving the full-color LEDs 8 in the color indicated by the color data for three seconds through PWM control (702).

Further, instead of being driven to emit the complementary color of the color of the flower, the full-color LEDs 8 may be driven to emit a color with the same hue as but a different saturation level from the color of the flower, or a color with a similar hue to the color of the flower. For example, when the color of the flower is blue, the full-color LEDs 8 may be driven to emit a color with the same hue as but a different saturation level from blue, or a color with a similar hue to blue.

Furthermore, instead of being driven to emit the complementary color of the color of the flower, the full-color LEDs 8 may be driven to emit a pattern suitable for a ceremonial occasion such as a wedding or a funeral. For example, when the color of the flower is red, the full-color LEDs 8 may be driven to emit a pattern of red-and-white stripes or a checker.

In this way, the light wall sculpture operates according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

A blooming space according to a sixth embodiment of the present invention has the vase-shaped device 1 shown in FIG. 1, the light wall sculpture, and a communication device, as shown in FIG. 2. The vase-shaped device 1 is the same as that of the first embodiment. The light wall sculpture is the same as that of the third embodiment.

Control boards as shown in FIG. 4 are provided for the vase-shaped device 1 and the light wall sculpture.

As shown in FIG. 4, the blooming space according to the sixth embodiment of the present invention operates as follows. First, the vase-shaped device 1 illuminates a flower put therein by driving the white LEDs 2. Then, the color sensor 4 receives light emitted by the white LEDs 2 and reflected from the flower, and thereby obtains data on the color of the flower put in the vase-shaped device 1. Then, the controller determines the color of the flower based on the obtained color data and generates an output signal according to the color determined. The controller then controls, based on this output signal, signal output of the output devices (the light-emitting devices in FIG. 4 are just an example) incorporated in the vase-shaped device 1 so that the signal output may be in accordance with the color of the arranged flower. Then, through wireless communication, the light wall sculpture receives the signal indicating the color of the flower obtained by the color sensor 4. Then, tile light-emitting signals are generated according to the received flower-color-indicating signal to cause the multiple full-color LEDs 8 incorporated in the tiles 7 to emit light.

In this way, the light wall sculpture operates in conjunction with the vase-shaped device 1 according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

A blooming space according to a seventh embodiment of the present invention has the vase-shaped device 1 shown in FIG. 1, the light wall sculpture, and a communication device, as shown in FIG. 2. The vase-shaped device 1 is the same as that of the first embodiment. The light wall sculpture is the same as that of the fourth embodiment.

Control boards as shown in FIG. 4 are provided for the vase-shaped device 1 and the light wall sculpture.

The blooming space according to the seventh embodiment of the present invention operates in the same way as that of the sixth embodiment.

In addition, a tile light-emitting signal generated by one of the tile modules is sent to at least one of the another tile modules through wireless communication. Then, the controller of the another tile module generates its own tile light-emitting signal according to the received tile light-emitting signal, and thereby causes the multiple full-color LEDs 8 incorporated in the tile 7 of its own tile module to emit light.

In this way, the light wall sculpture operates in conjunction with the vase-shaped device 1 according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

A blooming space according to an eighth embodiment of the present invention is the same as that of the sixth embodiment.

As shown in FIG. 4, the blooming space according to the eighth embodiment of the present invention operates as follows. First, the vase-shaped device 1 illuminates a flower put therein by driving the white LEDs 2. Then, the color sensor 4 receives light emitted by the white LEDs 2 and reflected from the flower, and thereby obtains data on the color of the flower put in the vase-shaped device 1. Then, the controller determines the color of the flower based on the obtained color data and generates an output signal according to the color determined. The controller then generates a signal for changing at least one of the color, luminous intensity, and blinking speed of light emitted by the full-color LEDs 3. Then, the controller causes the full-color LEDs 3 incorporated in the vase-shaped device 1 to emit light according to that signal. Further, through wireless communication, the light wall sculpture receives the flower-color-indicating obtained by the color sensor 4. Then, the controller generates a tile light-emitting signal according to the received flower-color-indicating signal, and thereby causes the multiple full-color LEDs 8 incorporated in the tile 7 to emit light.

Color control of the vase-shaped device 1 according to the eighth embodiment of the present invention is the same as that of the second embodiment.

In this way, the light wall sculpture operates in conjunction with the vase-shaped device 1 according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

A blooming space according to a ninth embodiment of the present invention is the same as that of the seventh embodiment.

The blooming space according to the ninth embodiment of the present invention operates in the same way as that of the eighth embodiment.

In addition, a tile light-emitting signal generated by one of the tile modules is sent to at least one of the another tile modules through wireless communication. Then, the controller of the different tile module generates its own tile light-emitting signal according to the received tile light-emitting signal, and thereby causes the multiple full-color LEDs 8 incorporated in the tile 7 of its own tile module to emit light.

Color control of the vase-shaped device 1 according to the ninth embodiment of the present invention is the same as that of the second embodiment.

In this way, the light wall sculpture operates in conjunction with the vase-shaped device 1 according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

A blooming space according to a tenth embodiment of the present invention is the same as that of the seventh embodiment.

As shown in FIG. 4, the blooming space according to the tenth embodiment of the present invention operates as follows. First, the vase-shaped device 1 illuminates a flower put therein by driving the white LEDs 2. Then, the color sensor 4 receives light emitted by the white LEDs 2 and reflected from the flower, and thereby obtains data on the color of the flower put in the vase-shaped device 1. Then, the controller determines the color of the flower based on the color data obtained and generates an output signal according to the color determined. The controller then controls, based on this output signal, signal output of the output devices (the light-emitting devices in FIG. 4 are just an example) incorporated in the vase-shaped device 1 so that the signal output may be in accordance with the color of the arranged flower. Then, through wireless communication, the light wall sculpture receives the signal indicating the color of the flower obtained by the color sensor 4. Then, the controller generates a tile light-emitting signal according to the received flower-color-indicating signal, and thereby changes at least one of the color, luminous intensity, and blinking speed of light emitted by the full-color LEDs 8 incorporated in the tile 7 of at least one of the tile modules constituting the light wall sculpture. Then, adjacent tile modules exchange signals through wireless communication. Each controller generates a tile light-emitting signal of its own tile module according to the signal acquired from its adjacent tile module, and thereby changes at least one of the color, luminous intensity, and blinking speed of light emitted by the full-color LEDs 8 incorporated in the tile 7 of its own tile module.

Control of the light wall sculpture according to the tenth embodiment of the present invention is the same as that of the fifth embodiment of the present invention.

In this way, the light wall sculpture operates in conjunction with the vase-shaped device 1 according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

A blooming space according to an eleventh embodiment of the present invention is the same as that of the seventh embodiment.

As shown in FIG. 4, the blooming space according to the eleventh embodiment of the present invention operates as follows. First, the vase-shaped device 1 illuminates a flower put therein by driving the white LEDs 2. Then, the color sensor 4 receives light emitted by the white LEDs 2 and reflected from the flower, and thereby obtains data on the color of the flower put in the vase-shaped device 1. Then, the controller determines the color of the flower based on the color data obtained and generates, according to the color determined, a signal for changing at least one of the color, luminous intensity, and blinking speed of light emitted by the full-color LEDs 3. Then, the full-color LEDs 3 incorporated in the vase-shaped device 1 emit light according to that signal. Further, through wireless communication, the light wall sculpture receives the signal indicating the color of the flower obtained by the color sensor 4. Then, the controller generates a tile light-emitting signal according to the received flower-color-indicating signal, and thereby changes at least one of the color, luminous intensity, and blinking speed of light emitted by the multiple full-color LEDs 8 incorporated in the tile 7 of at least one of the tile modules constituting the light wall sculpture. Then, adjacent tile modules exchange signals through wireless communication. Each controller generates a tile light-emitting signal of its own tile module according to the signal acquired from the adjacent tile module, and thereby changes at least one of the color, luminous intensity, and blinking speed of light emitted by the full-color LEDs 8 incorporated in the tile 7 of its own tile module.

Color control of the vase-shaped device 1 according to the eleventh embodiment of the present invention is the same as that of the second embodiment. Control of the light wall sculpture according to the eleventh embodiment of the present invention is the same as that of the fifth embodiment.

In this way, the light wall sculpture operates in conjunction with the vase-shaped device 1 according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

Figure 7:
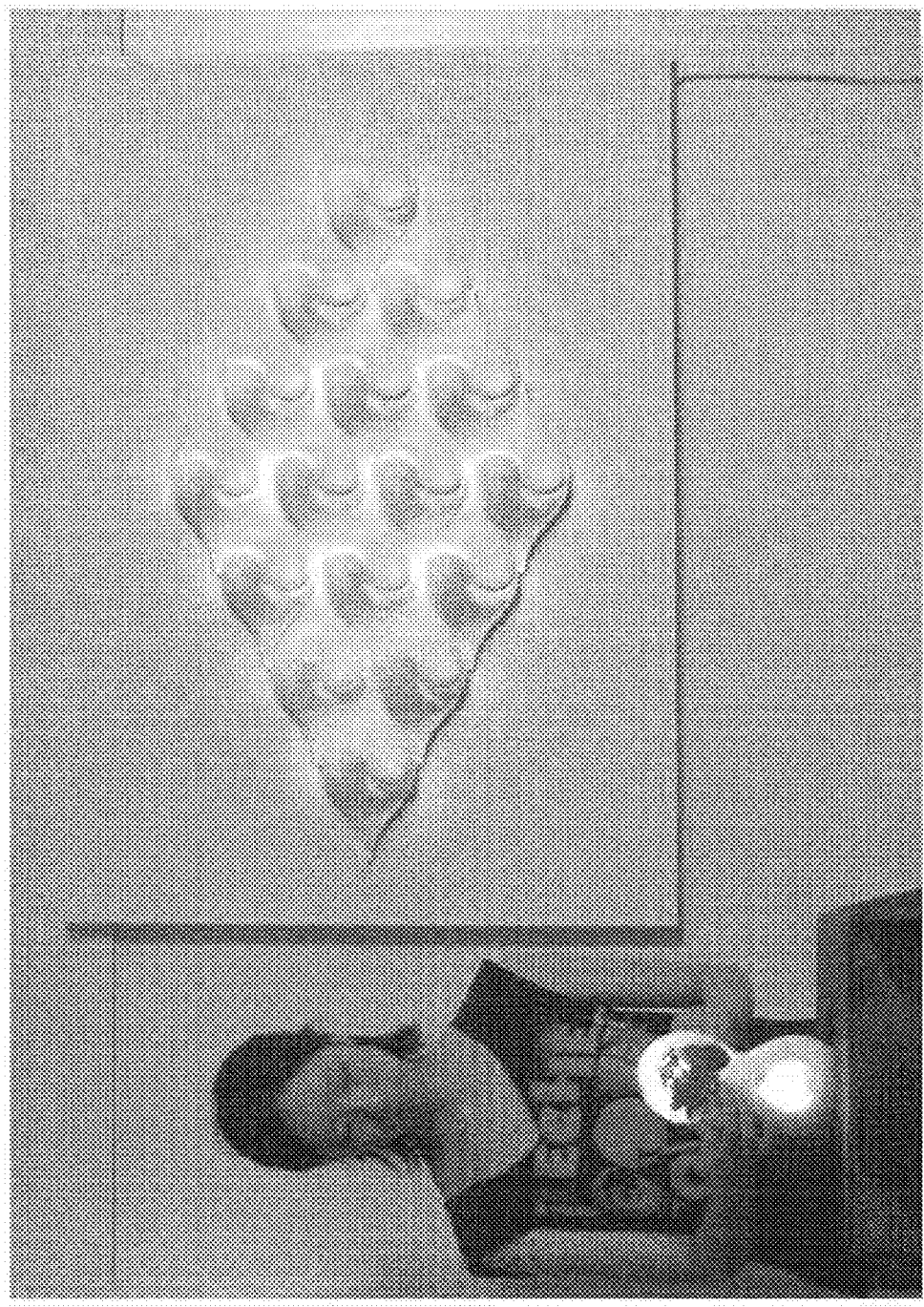
FIG. 7 is a diagram showing the eleventh embodiment of the present invention.
Figure 8:
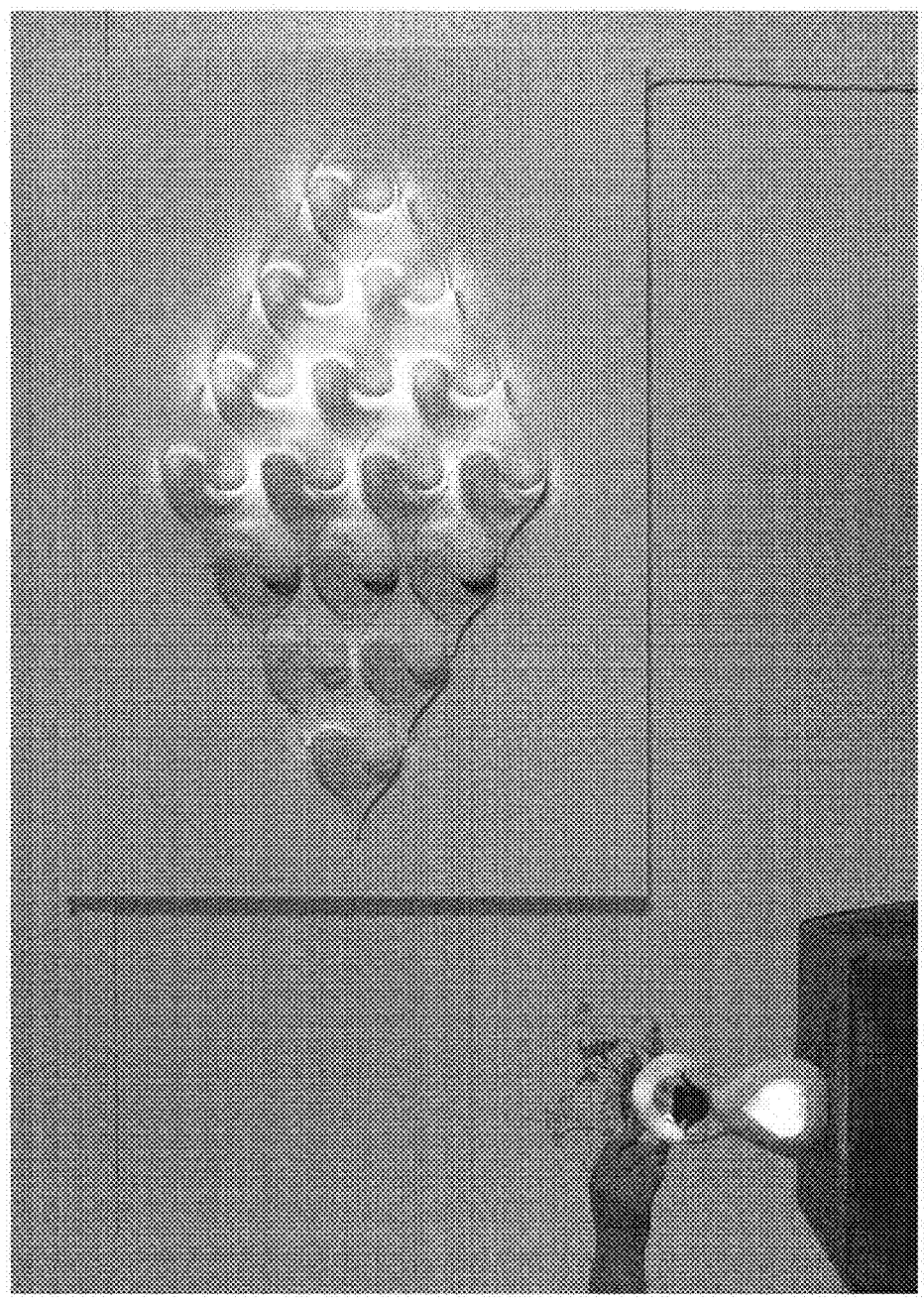
FIG. 8 is a diagram showing an embodiment a few seconds after the embodiment of the present invention shown in FIG. 7.

FIGS. 7 and 8 show how the blooming space according to the eleventh embodiment of the present invention is actually used. As shown in FIGS. 7 and 8, the conjunction among the flowers arranged in the vase-shaped device 1, the vase-shaped device 1, and the light wall sculpture allows the color of the vase-shaped device 1 to change according to the color of the arranged flowers, and also allows the color of the flowers to gradually spread on the light wall 6 of the light wall sculpture. In this way, an effect of spatial decoration around the flowers is provided through beautiful presentation of the flower arrangement which accentuates the beauty of the flower by dynamically reflecting the flexible flower-arrangement performance of the artist in the spatial decoration.

A blooming space according to a twelfth embodiment of the present invention is the same as that of the sixth embodiment.

The blooming space according to the twelfth embodiment of the present invention operates in the same way as that of the sixth embodiment.

In addition, the light wall sculpture sends the tile light-emitting signal, according to which the output devices incorporated in the vase-shaped device 1 perform their output.

In this way, the light wall sculpture operates in conjunction with the vase-shaped device 1 according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

A blooming space according to a thirteenth embodiment of the present invention is the same as that of the seventh embodiment.

The blooming space according to the thirteenth embodiment of the present invention operates in the same way as that of the seventh embodiment.

In addition, the tile module sends the tile light-emitting signal, according to which the output devices incorporated in the vase-shaped device 1 perform their output.

In this way, the light wall sculpture operates in conjunction with the vase-shaped device 1 according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

A blooming space according to a fourteenth embodiment of the present invention is the same as that of the sixth embodiment.

The blooming space according to the fourteenth embodiment of the present invention operates in the same way as that of the eighth embodiment.

In addition, the light wall sculpture sends the tile light-emitting signal, according to which the full-color LEDs 3 incorporated in the vase-shaped device 1 emit light.

Color control of the vase-shaped device 1 according to the fourteenth embodiment of the present invention is the same as that of the second embodiment.

In this way, the light wall sculpture operates in conjunction with the vase-shaped device 1 according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

A blooming space according to a fifteenth embodiment of the present invention is the same as that of the seventh embodiment.

The blooming space according to the fifteenth embodiment of the present invention operates in the same way as that of the ninth embodiment.

In addition, the tile module sends the tile light-emitting signal, according to which the full-color LEDs 3 incorporated in the vase-shaped device 1 emit light.

Color control of the vase-shaped device 1 according to the fifteenth embodiment of the present invention is the same as that of the second embodiment.

In this way, the light wall sculpture operates in conjunction with the vase-shaped device 1 according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

A blooming space according to a sixteenth embodiment of the present invention is the same as that of the seventh embodiment.

The blooming space according to the sixteenth embodiment of the present invention operates in the same way as that of the tenth embodiment.

In addition, the tile module sends the tile light-emitting signal, according to which the output devices incorporated in the vase-shaped device 1 perform their output.

Further, control of the light wall sculpture according to the sixteenth embodiment of the present invention is the same as that of the fifth embodiment.

In this way, the light wall sculpture operates in conjunction with the vase-shaped device 1 according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

A blooming space according to a seventeenth embodiment of the present invention is the same as that of the seventh embodiment.

The blooming space according to the seventeenth embodiment of the present invention operates in the same way as that of the eleventh embodiment.

In addition, the tile module sends the tile light-emitting signal, according to which the full-color LEDs 3 incorporated in the vase-shaped device 1 emit light.

Color control of the vase-shaped device 1 according to the seventeenth embodiment of the present invention is the same as that of the second embodiment. Control of the light wall sculpture according to the seventeenth embodiment of the present invention is the same as that of the fifth embodiment.

In this way, the light wall sculpture operates in conjunction with the vase-shaped device 1 according to the color of the arranged flower to provide an effect of spatial decoration around the flower through beautiful presentation of the flower arrangement which accentuates the beauty of the flower by dynamically reflecting the flexible flower-arrangement performance of the artist in the spatial decoration.

According to the present invention, by illuminating a flower put in the vase-shaped device using light-emitting devices, the color of the flower can be reliably detected, and the flower can be illuminated at the same time. Further, besides the light-emitting devices used for illuminating the flower, light-emitting devices are incorporated to illuminate the surface of the vase-shaped device which has a three-dimensional form. Thus, a vase-shaped device whose surface changes in color can be provided. In this way, space around the vase-shaped device is also illuminated by light from the light-emitting devices illuminating the flower and light from the light-emitting devices illuminating the vase-shaped device. Thereby, when placed in a dark place, the vase-shaped device can provide light decoration to the space therearound.

In the present invention, to maximize the effect of the color of the arranged flower, the vase-shaped device being a decorative object located closest to the arranged flower and the tiles (the light wall) being a decorative object which can be placed in a space near the arranged flower can both operate in conjunction with the color of the flowers by programs. This can provide an effect in which the color of the flower appears to be spreading from the flower to the vase-shaped device located close to the flower, and then to the tiles located with some distance from the flower. Further, by surrounding the flower with the vase-shaped device, which is to be located under the flower, and with the tiles located with some distance from the flower, the decorative bodies having the flower as its center can exercise a color change capability so that the color of the flower can be emphasized to the fullest.

For example, by changing the colors of the vase-shaped device and the tiles to the complementary color of the color of the flower, the color of the flower can be stood out to allow brilliant, gorgeous decoration of the space.

In addition, by changing the colors of the vase-shaped device and the tiles to a color with the same hue as but a different saturation level from the color of the flower or to a color with a similar hue to the color of the flower, the effect of the color can be maximized to provide the spatial decoration.

Further, spatial decoration according to a ceremonial occasion, such as a wedding or a funeral, can be provided by changing the color pattern of the vase-shaped device and the tiles according to the occasion.

The present invention can provide decoration by the vase-shaped device and the wall surface which are harmonious with the color of the arranged flower, to a place where flowers are periodically replaced, for example, an elevated alcove, a space in a hotel lobby, a wall surface in a hospital, or the like.

The users can be entertained when the vase-shaped device emits light. The users can be entertained even more when output of light or sound by the vase-shaped device or an environment where the vase-shaped device is used changes according to the color of the arranged flower.

The present invention can provide a vase-shaped device which entertains the users by changing, according to the change in color of the arranged flower, an output signal or an output mode of light, sound, or the like of the vase-shaped device or an environment where the vase-shaped device is used and can also provide a blooming space employing this vase-shaped device.

According to the present invention, since an output signal or an output mode of light, sound, or the like of the vase-shaped device or an environment where the vase-shaped device is used is changed according to the change in color of the arranged flower, the levels of satisfaction of a person performing flower arrangement using the vase-shaped device and a person watching the flower arrangement can be raised.

As described above, in the vase-shaped device and the blooming space according to the present invention, a flower put in the vase-shaped device is illuminated, and the light-emitting devices incorporated in the vase-shaped device emit light. Thereby, when placed in a dark place, the vase-shaped device can provide light decoration to the space around the flower. Further, the vase-shaped device, the light wall sculpture, and the blooming space according to the present invention implement novel "interactive flower arrangement" which also includes creation of spatial decoration. Thus, an effect of spatial decoration around the flower can be provided through accentuation of the beauty of the flower by dynamically reflecting the flexible flower-arrangement performance of the artist in the spatial decoration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A vase-shaped device comprising:
    an output unit configured to output a signal as controlled;
    a first light-emitting device configured to illuminate a flower put in the vase-shaped device;
    a color sensor configured to obtain data on a color of the flower by using light emitted by the first light-emitting device and reflected from the flower;
    a determination unit configured to determine the color of the flower based on the data obtained by the color sensor; and
    a control processing unit configured to generate the signal to be outputted from the output unit, according to a result of the determination by the determination unit.

2. The vase-shaped device according to claim 1, wherein the output unit is a second light-emitting device configured to emit a plurality of colors of light, and
    the control processing unit changes, based on the result of the determination by the determination unit, at least one of a color, luminous intensity, and blinking speed of light emitted by the second light-emitting device.

3. A system comprising a vase-shaped device, a light wall device, and a first communication unit, wherein
    the vase-shaped device includes
    an output unit configured to output a first signal as controlled;
    a first light-emitting device configured to illuminate a flower put in the vase-shaped device,
    a color sensor configured to obtain data on a color of the flower by using light emitted by the first light-emitting device and reflected from the flower,
    a determination unit configured to determine the color of the flower based on the data obtained by the color sensor, and
    a control processing unit configured to generate the first signal to be outputted from the output unit, according to a result of the determination by the determination unit, and for controlling output of the first signal,
    the first communication unit is a communication unit configured to send a signal indicating the color obtained by the color sensor to the light wall device, and
    the light wall device includes
    a control processing unit configured to generate a tile light-emitting signal according to the color-indicating signal received through the first communication unit, and
    a tile including a third light-emitting device configured to emit light according to the tile light emitting signal.

4. The system according to claim 3, wherein
    the first communication unit includes a communication unit configured to receive the tile light-emitting signal sent from the light wall device.

5. A system comprising a vase-shaped device, a light wall device, and a first communication unit, wherein
    the vase-shaped device includes
    an output unit configured to output a first signal as controlled;
    a first light-emitting device configured to illuminate a flower put in the vase-shaped device,
    a color sensor configured to obtain data on a color of the flower by using light emitted by the first light-emitting device and reflected from the flower,
    a determination unit configured to determine the color of the flower based on the data obtained by the color sensor, and
    a control processing unit configured to generate the first signal to be outputted from the output unit, according to a result of the determination by the determination unit, and to control output of the first signal,
    the light wall device includes
    a plurality of tile modules, and
    a second communication unit configured to send a tile light-emitting signal generated by one of the tile modules to at least one of the another tile modules, the first communication unit is a communication unit configured to send a signal indicating the color obtained by the color sensor to at least one of the tile modules, and each of the tile modules includes a control processing unit configured to generate a tile light-emitting signal of its own tile module according to any one of the color-indicating signal received through the first communication unit and the tile light-emitting signal received from another one of the tile modules through the second communication unit, and a tile having a third light-emitting device configured to emit light according to the tile light-emitting signal generated by its own tile module.

6. The system according to claim 5, wherein the first communication unit includes a communication unit configured to receive the tile light-emitting signal sent from the tile modules.

7. A system comprising a vase-shaped device, a light wall device, and a first communication unit, wherein the vase-shaped device includes an output unit configured to output a first signal as controlled;

a first light-emitting device configured to illuminate a flower put in the vase-shaped device, a color sensor configured to obtain data on a color of the flower by using light emitted by the first light-emitting device and reflected from the flower, a determination unit configured to determine the color of the flower based on the data obtained by the color sensor, and a control processing unit configured to generate the first signal to be outputted from the output unit, according to a result of the determination by the determination unit, and to control output of the first signal, the output unit is a second light-emitting device configured to emit a plurality of colors of light, the control processing unit changes, based on the result of the determination by the determination unit, at least one of a color, luminous intensity, and blinking speed of light emitted by the second light-emitting device, the first communication unit is a communication unit configured to send a signal indicating the color obtained by the color sensor to the light wall device, and the light wall device includes a control processing unit configured to generate a tile light-emitting signal according to the color-indicating signal received through the first communication unit, and a tile having a third light-emitting device configured to emit light according to the tile light-emitting signal.

8. The system according to claim 7, wherein the first communication unit includes a communication unit configured to receive the tile light-emitting signal sent from the light wall device.

9. A system comprising a vase-shaped device, a light wall device, and a first communication unit, wherein the vase-shaped device includes an output unit configured to output a first signal as controlled;

a first light-emitting device configured to illuminate a flower put in the vase-shaped device, a color sensor configured to obtain data on a color of the flower by using light emitted by the first light-emitting device and reflected from the flower, a determination unit configured to determine the color of the flower based on the data obtained by the color sensor, and a control processing unit configured to generate the first signal to be outputted from the output unit, according to a result of the determination by the determination unit, and to control output of the first signal, the output unit is a second light-emitting device configured to emit a plurality of colors of light, the control processing unit changes, based on the result of the determination by the determination unit, at least one of a color, luminous intensity, and blinking speed of light emitted by the second light-emitting device, the light wall device includes a plurality of tile modules, and a second communication unit configured to send a tile light-emitting signal generated by one of the tile modules to at least one of the another tile modules, the first communication unit is a communication unit configured to send a signal indicating the color obtained by the color sensor to at least one of the tile modules, and each of the tile modules includes a control processing unit configured to generate the tile light-emitting signal of its own tile module according to any one of the color-indicating signal received through the first communication unit and the tile light-emitting signal received from another one of the tile modules through the second communication unit, and a tile having a third light-emitting device configured to emit light according to the tile light-emitting signal.

10. The system according to claim 9, wherein the first communication unit includes a communication unit configured to receive the tile light-emitting signal sent from the tile modules.

11. A system comprising a vase-shaped device, a light wall device, and a first communication unit, wherein the vase-shaped device includes an output unit configured to output a first signal as controlled;

a first light-emitting device configured to illuminate a flower put in the vase-shaped device, a color sensor configured to obtain data on a color of the flower by using light emitted by the first light-emitting device and reflected from the flower, a determination unit configured to determine the color of the flower based on the data obtained by the color sensor, and a control processing unit configured to generate the first signal to be outputted from the output unit, according to a result of the determination by the determination unit, and to control output of the first signal, the first communication unit is a communication unit configured to send a signal indicating the color obtained by the color sensor to the light wall device, and the light wall device includes a plurality of tile modules, and a second communication unit configured to send a tile light-emitting signal generated by one of the tile modules to at least one of the another tile modules, and each of the tile modules includes a control processing unit configured to generate a tile light-emitting signal according to the color-indicating signal received through the first communication unit, a tile having a third light-emitting device configured to emit light according to the tile light-emitting signal, the tile light-emitting signal changes at least one of a color, luminous intensity, and blinking speed of light emitted by a plurality of the third light-emitting devices incorporated in the tile of the tile module, according to any one of the signal received through the first communication unit and the tile light-emitting signal received from another one of
the tile modules through the second communication unit, and the tile modules, whose respective tiles are adjacent to each other in terms of position, exchange signals through the second communication unit.

12. The system according to claim 11, wherein
the first communication unit includes a communication unit configured to receive the tile light-emitting signal sent from the tile modules.

13. A system comprising a vase-shaped device, a light wall device, and a first communication unit, wherein
the vase-shaped device includes
an output unit configured to output a first signal as controlled;
a first light-emitting device configured to illuminate a flower put in the vase-shaped device,
a color sensor configured to obtain data on a color of the flower by using light emitted by the first light-emitting device and reflected from the flower,
a determination unit configured to determine the color of the flower based on the data obtained by the color sensor, and
a control processing unit configured to generate the first signal to be outputted from the output unit, according to a result of the determination by the determination unit, and to control output of the first signal,
the output unit is a second light-emitting device configured to emit a plurality of colors of light,
the control processing unit changes, based on the result of the determination by the determination unit, at least one of a color, luminous intensity, and blinking speed of light emitted by the second light-emitting device,
the light wall device includes
a plurality of tile modules, and
a second communication unit configured to send a tile light-emitting signal generated by one of the tile modules to at least one of the another tile modules, and
the first communication unit is a communication unit configured to send a signal indicating the color obtained by the color sensor to at least one of the tile modules,
each of the tile modules includes
a control processing unit configured to generate a tile light-emitting signal according to the color-indicating signal received through the first communication unit,
a tile having a third light-emitting device configured to emit light according to the tile light-emitting signal, and
the tile light-emitting signal changes at least one of a color, luminous intensity, and blinking speed of light emitted by a plurality of the third light-emitting devices incorporated in the tile of the tile module according to any one of the signal received through the first communication unit and the tile light-emitting signal received from another one of the tile modules through the second communication unit, and
the tile modules, whose respective tiles are adjacent to each other in terms of position, exchange signals through the second communication unit.

14. The system according to claim 13, wherein
the first communication unit includes a communication unit configured to receive the tile light-emitting signal sent from the tile modules.

* * * * *